Patented Apr. 18, 1939

2,155,069

UNITED STATES PATENT OFFICE 2,155,069

GLASSY RESINLIKE FERRIC SULPHATE AND METHOD OF PREPARING THE SAME

William S. Wilson, Brookline, and John F. White, Somerville, Mass., assignors, by mesne assignments, to Monsanto Chemical Company, a corporation of Delaware No Drawing. Application May 16, 1934, Serial No. 725,903

8 Claims. (Cl. 23—126)

This invention relates to the preparation of sulphates of iron and it has particular relation to the preparation of such sulphates in the ferric state.

The main objects of the invention are to provide solid ferric sulphate compounds which are quickly and completely soluble in water; to provide solid ferric sulphate compounds which readily dissolve in water without the production of appreciable amounts of insoluble residues; the provision of highly soluble solid solutions of ferric sulphate compounds containing only small amounts of water; to provide solid ferric sulphate compounds which are especially suitable for use as precipitating agents in the sizing of paper and for similar purposes; and to provide a simple and economical method of preparing material of the above indicated class. These and other objects will be apparent from perusal of the following specifications.

Aqueous ferric sulphate solution has heretofore been proposed for numerous uses, including use as a coagulant for the purification of water and sewage, and as an astringent in the sizing of paper. Sulphates suitable for these purposes were conveniently prepared by various methods. For example, one method involved oxidation of ferrous sulphate to the ferric state by means of chlorine gas or nitric acid. However, another, and in many cases more economical method, involved the treatment of ferric oxides, such as iron ores or the oxide obtained in the roasting of pyrite, with sulphuric acid. The sulphates were obtained initially as aqueous solutions which were then evaporated to dryness to form a product which could be handled and transported economically.

A relatively large number of these ferric sulphate salts were known to exist under various conditions and these were distinguished from one another by variation in the relative proportions of sulphate radical and iron oxide, the amount of water of crystallization present, and the relative solubility in water, etc. The following constitute some of the sulphates which have been identified in the liquors or in the final product under various conditions of operation:

$Fe_2O_3 4SO_3 9H_2O$
$Fe_2O_3 4SO_3 3H_2O$
$Fe_2O_3 3SO_3$
$Fe_2O_3 3SO_3 \cdot 6H_2O$
$Fe_2O_3 3SO_3 7H_2O$
$Fe_2O_3 2SO_3 H_2O$
$Fe_2O_3 2SO_3 5H_2O$
$2Fe_2O_3 5SO_3 17H_2O$ The compounds containing the iron oxide and the sulphate radicals in the relative ratios expressed by the formula $Fe_2O_3 3SO_3$ were termed neutral or normal sulphates. These were generally relatively water soluble. The sulphates containing higher relative amounts of ferric oxide were termed basic salts, while those containing a higher ratio of $SO_3$ were termed acid salts. Many of these sulphates, particularly the basic salts, are relatively insoluble and heretofore difficulty has been encountered in obtaining solid products which were free of insoluble compounds.

Solutions of ferric sulphate prepared in the ordinary manner by the reaction of sulphuric acid upon burnt pyrite or a ferric oxide ordinarily consist of relatively complex mixtures of a plurality of these salts. In order to admit of the convenient handling of the salt it is desirable to reduce it to the solid form containing as small a proportion of water as can economically be obtained. However, this conversion of the solutions has not heretofore been satisfactorily obtained for various reasons. For example, the solutions after they have been boiled down to a relatively low water content tend to become so viscous that heat transfer to the solutions becomes practically impossible and the material can only be obtained as a viscous solution which is extremely difficult to handle. In the case of the basic salts it has heretofore been found to be impossible to effect solidification thereof without converting them into practically insoluble state.

This invention involves the discovery of a convenient method of transforming viscous solutions of normal ferric sulphate, containing relatively small amounts of either the acid or the basic ferric sulphate salts in solution, into the form of a solid apparently of non-crystalline structure which is quickly and substantially completely soluble in water even in the cold state. As aforementioned, this material is apparently non-crystalline but this is not definitely known. The material in appearance suggests glassy shellac-like flakes. These flakes may be a crystalline compound or a solid solution of the sulphate in water or some other state of aggregation. Hereafter this material is referred to as a "solid solution" or a non-crystalline substance. This is effected by boiling the solutions down to as concentrated a state as is practicable and then subjecting them to a very rapid evaporation until they are converted into solid solutions.

Ferric sulphate solutions containing either acid or basic ferric sulphate prepared by substantially any convenient method, for example by the oxidation of ferrous sulphate with nitric acid, may be used. However, the following constitutes a convenient and economical method of preparing such solutions:

For reasons of economy it is preferred to start with a solution of ferric sulphate obtained by treating ferric oxide obtained, for example, by the roasting of pyrite in the manufacture of sulphuric acid. A convenient method of forming such solutions of ferric sulphates from pyrite cinder is disclosed in our copending application Serial No. 725,901, filed May 16, 1934. According to this process the ferric oxide or pyrite cinder in 20% or 25% excess of that theoretically required is treated with sulphuric acid of approximately 35°–40° Bé. If acid of lower concentration than this is employed the time of reaction is increased to an unreasonable degree and if acid of materially higher concentration is employed acid salts may be precipitated. During the reaction there is considerable evaporation of water so that the ratio of total $SO_3$ to water tends to rise and care should be taken to prevent it from becoming higher than that represented by acid of about 40° Bé. (taken at boiling point) during initial stages of the reaction else acid salts just mentioned will tend to crystallize out or precipitate. This precipitation, if unchecked, may proceed so far that the entire mass sets up. Such tendency may be corrected, if it occurs, by the addition of a suitable amount of water whenever acid salts begin to separate. After approximately 27% to 50% of the acid has combined with iron oxide, this tendency of the acid salts to precipitate ceases and it is found that only neutral salts will separate. It then becomes quite possible to concentrate the solution by boiling at normal or under reduced pressures without the formation of the undesirable components and usually the solution is concentrated to approximately 59° to 60° Bé. before being subjected to subsequent treatment.

Preferably, as above mentioned, a considerable excess of cinder, for example a 20% or 25% excess, is introduced for purposes of speeding up the reaction and effecting more nearly complete conversion of the sulphuric acid within a reasonable period. The excess, together with silicates or other insoluble material, are removed at completion of the reaction by decantation or filtration. Concentration of the solution may be conducted at or near normal boiling temperatures, provided conditions are so regulated as to prevent separation of crystals in the liquor and provided the temperature is not maintained for too long a period of time. Generally, approximately six or seven hours is permissible. The concentration of the liquor at this stage should be approximately 60° Bé.

For purposes of forming an acid material from such solution preliminary treatment before converting the liquor into the solid state is not required. However, the solution of liquor in its initial state will contain some ferrous sulphate and usually this should be kept relatively low (not more than 3 or 4 per cent of the total iron). The amount of iron in ferrous state may be reduced by oxidizing with nitric acid, and by suitable regulation of the amount of ferrous iron present the amount of free sulphuric acid is likewise reduced. It is possible to obtain any desired reduction of the amount of ferrous iron, even to the extent of entirely eliminating it; or, as will presently be explained in connection with the preparation of a ferric sulphate containing some basic sulphate, of converting it into the basic state.

Conversion of the liquor into "solid solution" state may be accomplished by the following treatment: It is only necessary to dry the solution upon a conventional drum with or without a vacuum. By this means the amount of water present is reduced from approximately 50% to approximately 25% and, of course, the ratio of solids correspondingly increases from 50% to 75%. The material as thus obtained contains primarily neutral ferric sulphate ($Fe_2O_3 3SO_3$) in a state of hydration probably corresponding to approximately 7 mols of water for each mol of the sulphate. In addition to the neutral sulphate, which constitutes the main portion of the material, there are present about 4% or 5% of the acid sulphates containing a higher proportion of $SO_3$ than that represented in the formula of the neutral sulphate. The solids as thus obtained exist in a resinous or non-crystalline form somewhat resembling in appearance a glass. This resinous substance may be a solid solution of the ferric compounds and the water which is present. However, physically the material appears to be completely dry and can be readily handled. The degree of solubility is very high and solution takes place within a minute or two even in cold water. Of course, solubility is even higher in hot water. In this respect they are unlike many sulphates which can be dissolved conveniently only in concentrated sulphate liquors.

For these reasons the material is particularly desirable for use in the sizing of paper because it can be added directly to the paper stock in solid state to effect immediate action upon the sizing materials.

If it is desirous to prepare a "solid solution" of ferric sulphate containing some basic sulphate, the liquors previously described may be treated at any convenient stage in the operations with an oxidizing agent such as nitric acid. Since normally the ferric oxides employed in the process contain a few per cent (for example, 4% or 5%) of pyrite or iron sulphides, the liquors obtained from the oxides contain a corresponding amount of ferrous sulphate. This sulphate upon treatment with the oxidizing agent is converted into ferric sulphate and the solution becomes basic if there is insufficient acid present. If an insufficient amount of ferrous iron, to react with all of the acid, is present, additional ferrous sulphate may be added.

Ferric sulphate solutions containing some basic ferric sulphate are concentrated to approximately 60° Bé. in the same manner as the acid sulphates which have already been described and the same precautions as to maintaining excessively high temperatures over extended periods of time are observed. In general, the concentration should not occupy a period materially greater than approximately 6 or 7 hours. After concentration is complete, a short period of storage, for example 4 or 5 hours, may be tolerated although, of course, such period of storage is required only for reasons of convenience in the preparation of batches of the material and not for purposes of imparting any peculiar properties to the product. In fact, it tends to be a detriment rather than an advantage in the final material.

The concentrated material is dried upon a drum with or without vacuum of conventional construction in the same manner as the acid sulphate which has already been described, and in this step water is evaporated until the water content is reduced to approximately 25%. The solid content will then be approximately 75%, of which under ordinary conditions of operation about 4% or 5% constitutes basic sulphates and nearly all other material is the normal sulphate.

It is to be understood that a drum drier constitutes only a convenient method of effecting quick conversion of the sulphates into "solid solutions." Other methods of quick drying may be employed in lieu thereof, and spray drying upon conventional apparatus is specifically contemplated because this like drum drying provides a convenient method of finely subdividing the solutions so that conversion of the product into "solid solution" state can be effected.

In physical appearance this basic material is a resinous or glass-like material comprising small flakes of shellac-like structure and of a yellow color. It is also perfectly dry to outward appearance although it might possibly be a "solid solution" of normal sulphate admixed with basic sulphates in water. These basic materials, like those already described, dissolve quickly and substantially completely in water, hot or cold, and for that reason constitute excellent substitutes for alum in the sizing of papers. It will be appreciated that in the drying operations upon the drum an undue period of time should not be required; however, a period of approximately 6 or 7 minutes seems to be admissible.

Although we have shown and described only the preferred embodiments of the invention it is to be understood that these embodiments are merely illustrative and various modifications may be made therein without departure from the scope of the invention or from the protection of the appended claims.

What we claim is:

1. A method of preparing highly soluble essentially normal ferric sulphates in the form of resinous solids which comprises concentrating a solution of the sulphates by application of heat and then subjecting the solution to evaporation upon a drum drier at a rate sufficiently rapid to inhibit formation of substantial amounts of insoluble basic sulphates whereby the material is transformed into a water soluble, solid, dry, glass-like partially hydrated state.

2. A method of manufacturing solid resin-like, substantially completely water soluble ferric sulphate which comprises preparing a solution of ferric sulphate containing a small amount of ferrous sulphate, oxidizing the ferrous sulphate to the basic state, concentrating the solution to approximately 60° Bé., then evaporating out water from the solution upon a drum drier at a rate sufficiently rapid to inhibit formation of substantial amounts of insoluble basic sulphates whereby the dry, readily soluble, glass-like resinous material is formed.

3. A rapidly and substantially completely water soluble composition of matter consisting of ferric sulphate and water and being in the form of a dry, glass-like, non-crystalline appearing resin-like solid which consists primarily of the normal salts and further characterized in that it is quickly and substantially completely soluble in both hot and cold water.

4. A normal ferric sulphate containing some basic ferric sulphate, in solid form, containing approximately 25% of water and being a dry, glass-like, amorphous appearing solid and being rapidly and substantially completely soluble in both hot and cold water.

5. A normal ferric sulphate containing some acid ferric sulphate, in solid form, which is rapidly and substantially completely soluble in both hot and cold water, contains approximately 25% of water in solid solution, and is a dry, glass-like, amorphous appearing solid product.

6. A method of treating concentrated water solutions of normal ferric sulphate which comprises distributing the solution as an adherent film upon a heated surface under vacuum to dry the solution at a rate sufficiently rapid to inhibit the formation of substantial quantities of insoluble basic materials to a solid state in which about 25% of water is retained, the solid material being glass-like in appearance and being substantially completely soluble in cold water.

7. A method as defined in claim 6 in which drying is completed within a period of about seven minutes.

8. A stable rapidly and substantially completely water soluble composition of matter consisting of normal ferric sulphate and water and being in the form of a glass-like, non-crystalline appearing, resin-like solid which consists primarily of the normal salts and further characterized in that it is rapidly and completely soluble in both hot and cold water.

WILLIAM S. WILSON.
JOHN F. WHITE.